US006342661B1

(12) United States Patent
Flamm

(10) Patent No.: US 6,342,661 B1
(45) Date of Patent: Jan. 29, 2002

(54) MULTI-STRING GUITAR PICK

(76) Inventor: Brent Flamm, 5231 Saint Moritz Ct., Sacramento, CA (US) 95842

( * ) Notice: Subject to any disclaimer, the term of this patent is extended or adjusted under 35 U.S.C. 154(b) by 0 days.

(21) Appl. No.: 09/686,531

(22) Filed: Oct. 10, 2000

Related U.S. Application Data

(60) Provisional application No. 60/159,220, filed on Oct. 13, 1999.

(51) Int. Cl.[7] .................................................. G01D 3/16
(52) U.S. Cl. ............................................ 84/322; 84/320
(58) Field of Search ........................... 84/322, 321, 320

(56) References Cited

U.S. PATENT DOCUMENTS

| | | | | | |
|---|---|---|---|---|---|
| 2,221,234 | A | * | 11/1940 | Frasier | 84/322 |
| 3,304,826 | A | * | 2/1967 | Caron | 84/322 |
| 3,312,137 | A | * | 4/1967 | Oddo | 84/322 |
| 4,398,444 | A | * | 8/1983 | Walker | 84/322 |
| 4,651,614 | A | * | 3/1987 | Cavallo | 84/322 |
| 4,790,227 | A | | 12/1988 | Lukehart | 84/322 |
| 5,253,562 | A | | 10/1993 | Kline | 84/322 |
| D358,833 | S | | 5/1995 | Ridley et al. | D17/20 |

FOREIGN PATENT DOCUMENTS

GB 194966 * 3/1923

* cited by examiner

*Primary Examiner*—Shih-Yung Hsieh
(74) *Attorney, Agent, or Firm*—Audrey A. Millemann

(57) ABSTRACT

A device for plucking the strings of a stringed musical instrument is disclosed. The device includes two thin, planar picking members and one thin, planar picking/grasping member. The picking members and the planar/grasping member are joined at their base. The device allows the user to simultaneously pluck two strings of an instrument or, alternatively, to pluck a single string.

10 Claims, 6 Drawing Sheets

MULTI-STRING GUITAR PICK

RELATED APPLICATION

This application claims the benefit of the filing date of earlier-filed, co-pending provisional application Ser. No. 60/159,220 filed on Oct. 13, 1999, pursuant to 35 U.S.C. § 119(e).

BACKGROUND OF THE INVENTION

1. Field of the Invention

The present invention relates generally to devices for playing a musical instrument, and more specifically, to devices for plucking the strings of a stringed instrument.

2. Description of the Related Art

Various types of devices have been used to pluck the strings of stringed musical instruments. These devices include simple guitar picks, as well as devices that allow the user to pluck a string in a more complex fashion to create different types of sounds. U.S. Pat. No. 5,253,562 issued to Kline discloses an example of the latter type of device.

Known plucking devices do not, however, allow the user to simultaneously pluck two strings of a stringed instrument. Thus, there is a need for a plucking device that allows the simultaneous plucking of two strings. There is also a need for a device that can be used either to pluck two strings simultaneously or to pluck a single string.

SUMMARY OF THE INVENTION

The invention is a hand-held device which allows a person to pluck simultaneously a plurality of strings of a stringed instrument. The invention comprises means for plucking two strings of a stringed musical instrument simultaneously and means for a user's hand to engage the plucking means.

In one aspect of the invention, the plucking means permits the user to pluck two adjacent strings simultaneously.

In another aspect of the invention, the plucking means permits the user to pluck two non-adjacent strings simultaneously.

An additional aspect of the invention is that, when engaged with the user s hand in an alternative orientation, the device permits the user to pluck a single string.

It is an object of the invention to allow a person to pluck simultaneously two adjacent strings of a stringed instrument.

It is a further object of the invention to allow a person to pluck simultaneously two non-adjacent strings of a stringed instrument.

It is another object of the invention to provide a device that allows a person to pluck multiple strings of a stringed instrument simultaneously, or, alternatively, to pluck a single string of the instrument.

It is also an object of the invention to provide the player of a stringed instrument greater versatility and enjoyment in playing music in that new musical compositions can be created and played, and existing musical compositions can be played differently It is also an object of the invention to provide the player of a stringed instrument an inexpensive device for obtaining greater versatility and enjoyment in the playing of music. dr

DETAILED DESCRIPTION OF THE INVENTION

Figure 1:
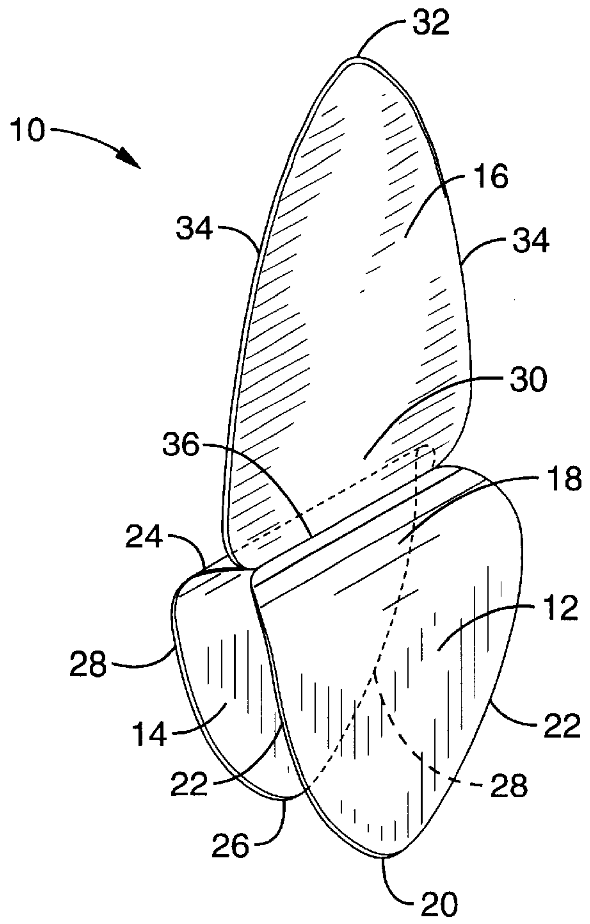
FIG. 1 is a perspective view of the device, showing an embodiment of the device which allows the player of a stringed instrument to pluck two adjacent strings of the instrument simultaneously.
Figure 2:
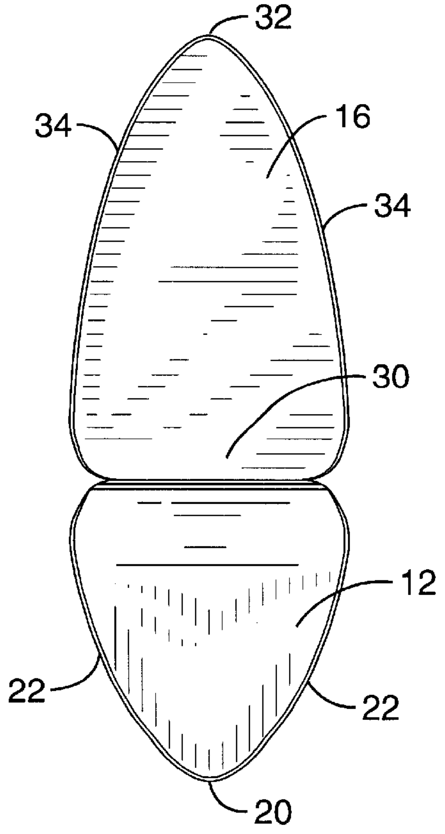
FIG. 2 is a side elevation of the device of FIG. 1.

FIG. 1 shows the inventive device 10. The preferred embodiment of device 10 includes two thin, planar picking members 12 and 14, and one thin, planar picking/grasping member 16, constructed of rigid nylon of the type commonly used to construct guitar picks. It has been found that the same nylon material produced by Dunlop Manufacturing, Inc. of Benicia, Calif., works satisfactorily. Other rigid materials of different thicknesses and compositions might also work satisfactorily in practicing the invention. The device may also be constructed of plastic, wood, or metal or a combination of nylon and these materials. Other rigid materials of different thicknesses and compositions might also work satisfactorily.

Picking members 12 and 14 are preferably identical in size and shape and generally similar to the size and shape of a conventional triangular guitar pick. Picking member 12 has a base portion 18 and a tip portion 20, and two side portions 22. Picking member 14 has a base portion 24 and a tip portion 26, and two side portions 28. Side portions 22 and 28 are preferably roughly 1¼ inches long. Base portions 18 and 24 are preferably roughly ⅞ inches long.

Picking/grasping member 16 is similar in size and shape to a conventional triangular guitar pick, but, for reasons set forth further below, picking/grasping member 16 is preferably longer from base to apex than a conventional guitar pick. Picking/grasping member 16 has a base portion 30 and a tip portion 32, and two side portions 34. Side portions 34 are preferably slightly longer than side portions 22 and 28. Base portion 30 is preferably the same length as base portions 18 and 24.

Picking members 12 and 14, and picking/grasping member 16 are joined at their bases to a common supporting portion 36. Picking members 12 and 14 are preferably disposed in parallel planes, with tip portions 20 and 26 extending away from supporting portion 36 in a first direction. Tip portions 20 and 26 are preferably equidistant from supporting portion 36.

Picking/grasping member 16 extends away from supporting portion 36 in a second direction, wherein the second direction is preferably opposite to, i.e., approximately 180 degrees from, the first direction. Picking/grasping member 16 is disposed in a plane parallel to, and intermediate to, the planes in which picking members 12 and 14 reside.

Common supporting portion 36 exists at the juncture of base portions 18, 24, and 30. This juncture could be the contact point of picking members 12 and 14 and picking/grasping member 16 in a one-piece, integral structure, or it could be a separate structure to which picking members 12 and 14 and picking/grasping member 16 are attached.

Device 10 is preferably a unitary, integral structure, molded, cast, or otherwise fashioned as a single piece; however, other constructions may also work satisfactorily as well. For example, separate picking members 12, 14, and 16 may be joined to a separate common supporting portion 36 to yield the inventive device.

Figure 3:
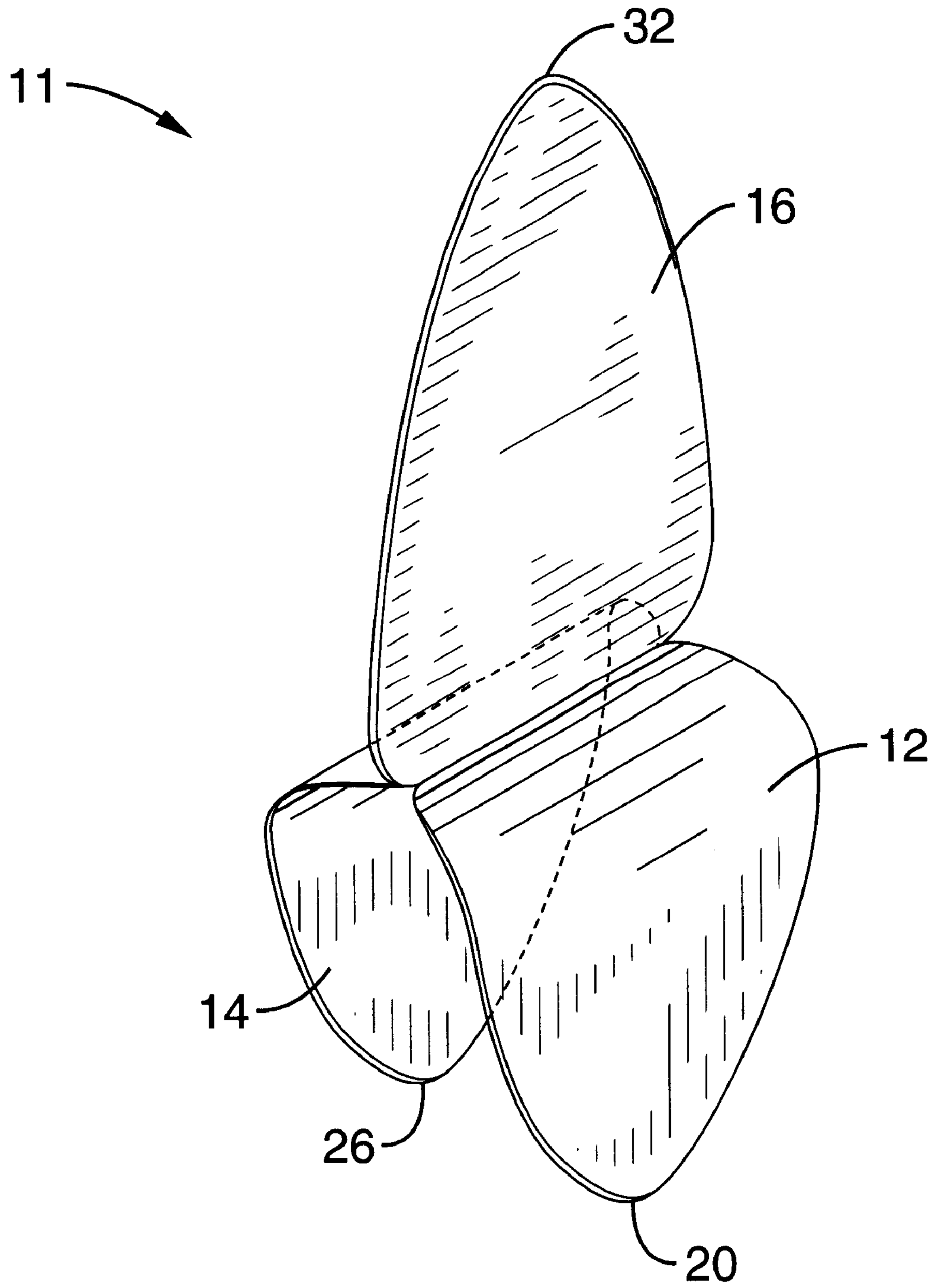
FIG. 3 is a perspective view of an alternative embodiment of the device of the invention, which allows the player of a stringed instrument to pluck two non-adjacent strings of the instrument simultaneously.
Figure 5:
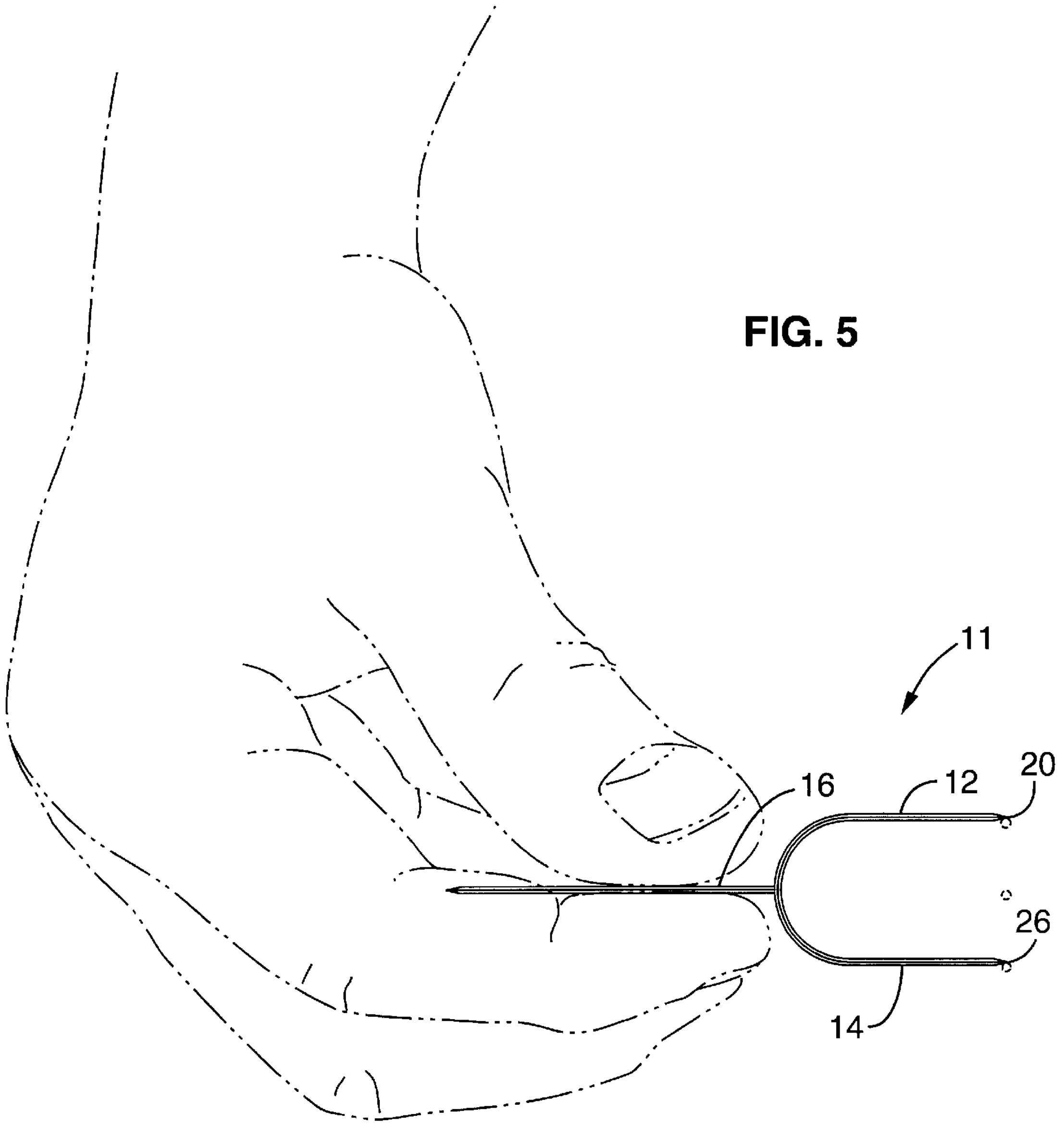
FIG. 5 is a side view of the device of FIG. 3, in use.

One embodiment of the invention allows the user to pluck two adjacent strings simultaneously, as shown in FIG. 1. In this embodiment, used to play a conventional six-string guitar, tip portions 20 and 26 are preferably 3/8" to 9/16" apart. Another embodiment of the invention allows the user to pluck two non-adjacent strings simultaneously. This alternative embodiment is shown in FIGS. 3 and 5 and is identified with reference numeral 11. In this embodiment, used to play a conventional six-string guitar, tip portions 20 and 26 are preferably 3/4" to 13/16" apart. The distances between tip portions 20 and 26 would be different for a device used to play stringed instruments other than a conventional six-string guitar, such as a banjo or sitar.

Figure 4:
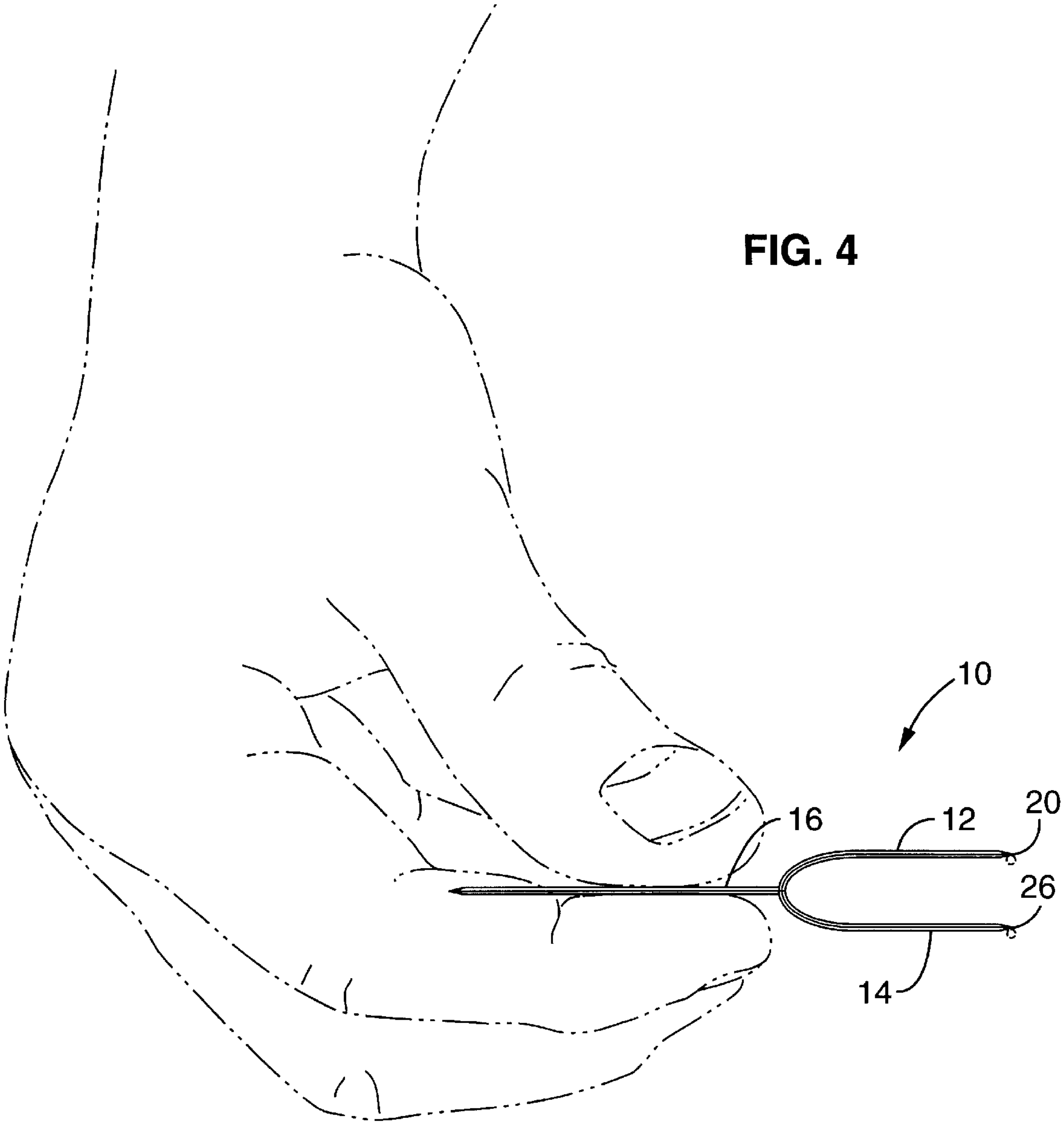
FIG. 4 is a side view of an embodiment of the device of FIG. 1, in use.
Figure 6:
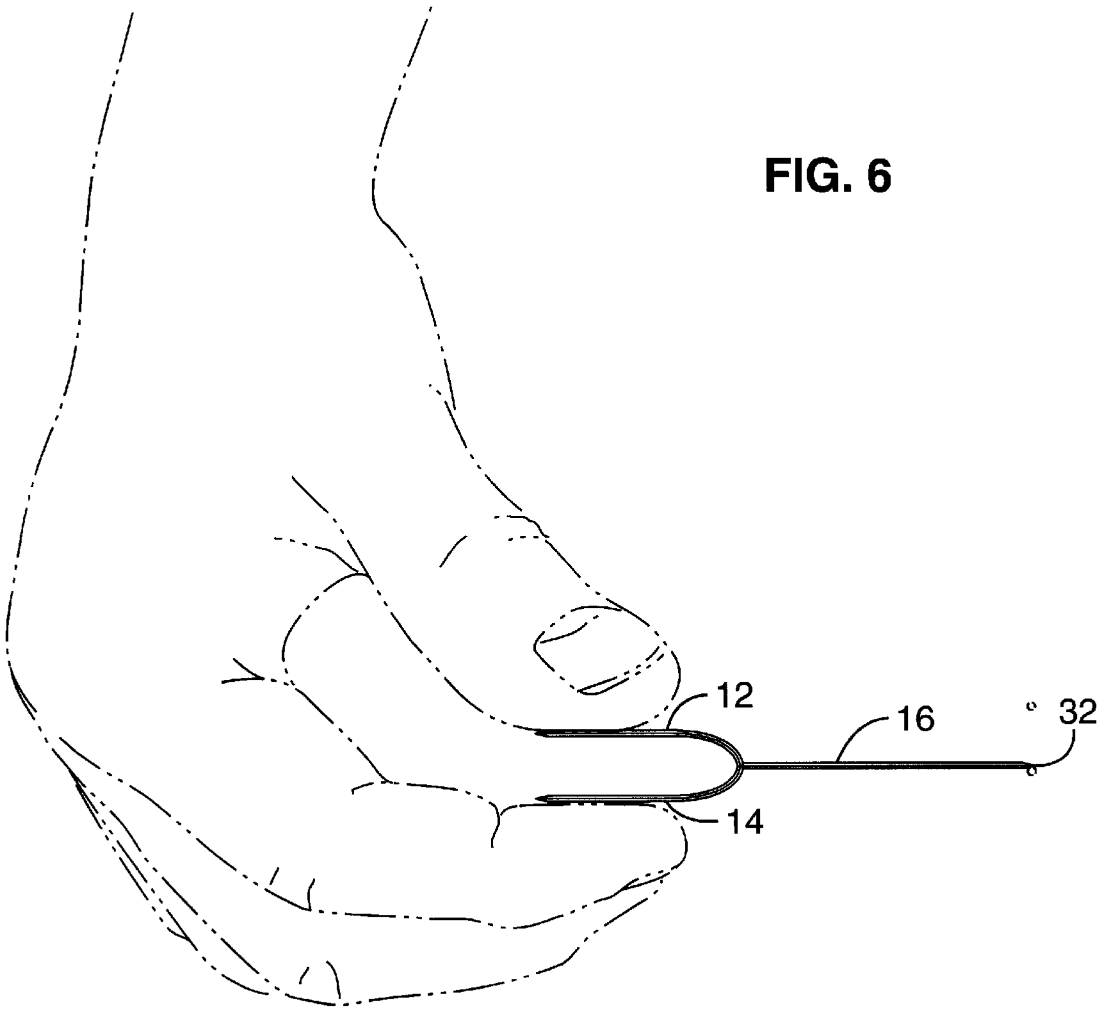
FIG. 6 is a side view of the device of FIG. 1 in use such that a single string of a stringed instrument is plucked, where the picking members of the device are held between the thumb and index finger of the user's hand.
Figure 7:
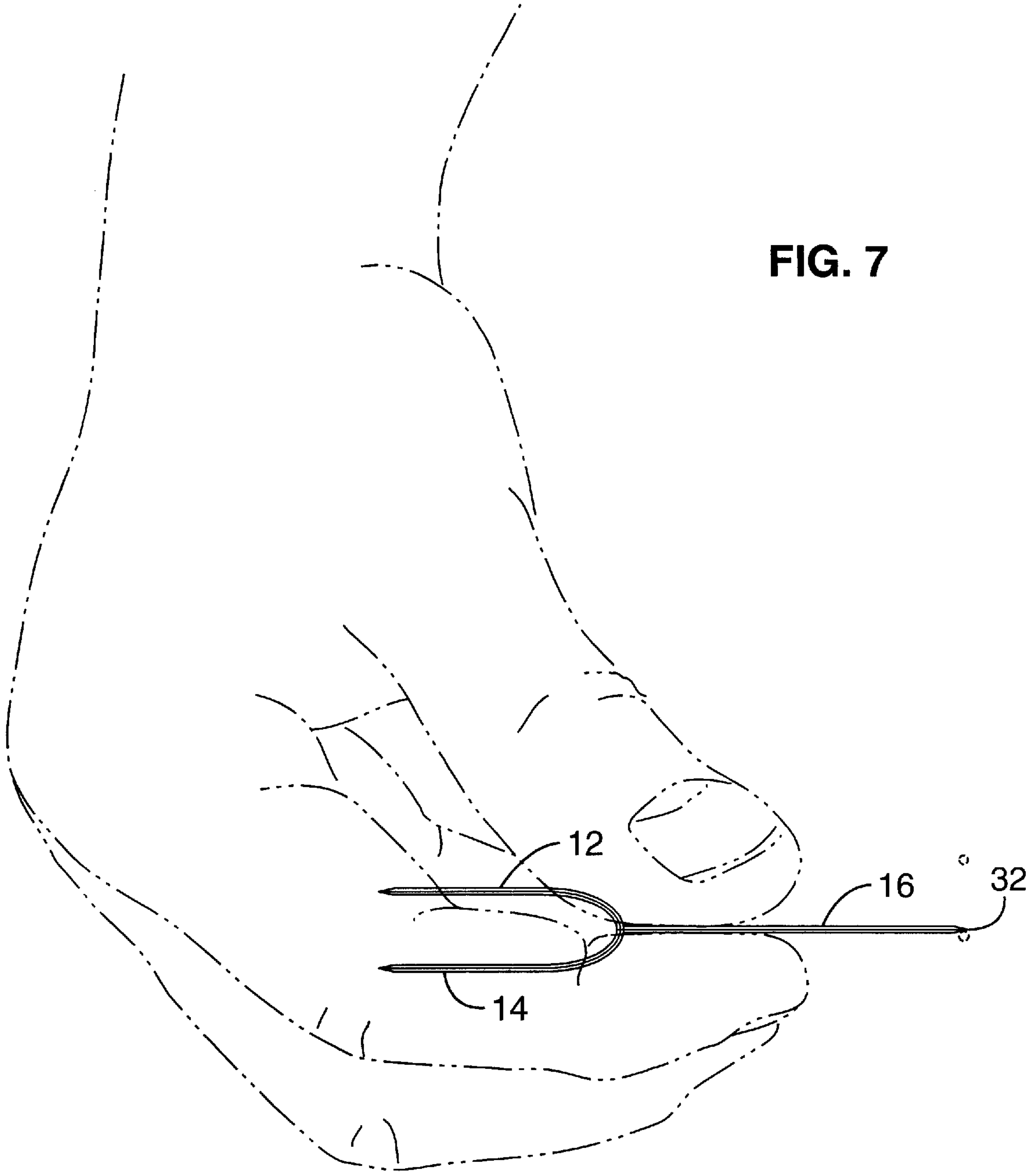
FIG. 7 is a side view of the device of FIG. 1 in use, such that a single string of a stringed instrument is plucked, held in an alternate fashion, where the picking/grasping member of the device is held between the thumb and index finger of the user's hand.

In use, as shown in FIG. 4, the player of a stringed instrument grasps picking/grasping member 16 of device 10 between the thumb and index finger of the hand and contacts the stringed instrument with tip portions 20 and 26 such that two strings of the instrument are plucked simultaneously. Specifically, FIG. 4 shows an embodiment of device 10 in use that allows the player to pluck two adjacent strings simultaneously. FIG. 5 shows another embodiment that allows the player to pluck two non-adjacent strings simultaneously. FIGS. 6 and 7 show device 10 in use in two alternative fashions that allow the player to pluck a single string of a stringed instrument. In one case, the player may grasp picking members 12 and 14 between the thumb and index finger of the hand, as shown in FIG. 6. In another case, the user may grasp picking/grasping member 16 between the thumb and index finger of the hand, as shown in FIG. 7. In both cases, the player contacts the stringed instrument with tip portion 32 such that a single string is plucked.

The foregoing disclosure of device 10 is illustrative of the preferred embodiment and is not a limitation upon the scope of the invention or the claims. There are other variations that fall within the scope of the claims. For example, picking members 12 and 14 may be disposed in planes which are not parallel to each other. In another variation, tip portions 20 and 26 may not be equidistant from supporting portion 36. In another example, picking/grasping member 16 may be disposed in a plane which is neither parallel nor intermediate to the planes in which picking members 12 and 14 reside. Picking/grasping member 16 may extend away from supporting portion 36 in a direction which is not approximately 180 degrees from the direction of picking members 12 and 14. Those skilled in the art will envision many other possible variations of the structure herein that nevertheless fall within the scope of the invention.

I claim:

1. A device, comprising:

a. Means for plucking simultaneously two strings of a stringed musical instrument, wherein said plucking means comprises first and second picking members of triangular shape, each having a base portion and a tip portion, whereby said first and second picking members are integral with each other at their said base portions; and b. Means for a user's hand to engage said plucking means, wherein said hand-engaging means comprises a third picking member of triangular shape, having a base portion and a tip portion, whereby said third picking member is integral with, at its said base portion, said first and second picking members, at their said base portions.

2. The device of claim 1, wherein said plucking means and said hand-engaging means extend in opposite directions and lie in parallel planes.

3. The device of claim 1, wherein:

a. Said first and second picking members lie in parallel planes and extend in a first direction; and b. Said third picking member lies in a parallel plane to said first and second picking members and further, extends in a second direction, 180 degrees opposite to said first direction.

4. The device of claim 1, wherein said tip portions of said first and second picking members are 3/8" to 9/16" apart.

5. The device of claim 1, wherein said tip portions of said first and second picking members are 3/4" to 13/16" apart.

6. A device, comprising:

a. A first picking member of triangular shape, having a base portion and a tip portion;

b. A second picking member of triangular shape, having a base portion and a tip portion;

c. A picking/grasping member of triangular shape, having a base portion and a tip portion; and d. An integral connection between said first picking member, said second picking member, and said picking/grasping member, at their bases.

7. The device of claim 6, wherein:

a. Said first and second picking members extend away from said supporting portion in a first direction; and b. Said picking/grasping member extends away from said supporting portion in a second direction that is opposite to and approximately 180 degrees away from said first direction.

8. The device of claim 6, wherein said tip portions of said first and second picking members are 3/8" to 9/16" apart.

9. The device of claim 6, wherein said tip portions of said first and second picking members are 3/4" to 13/16" apart.

10. The device of claim 6, wherein:

a. Said first and second picking members lie in parallel planes and extend in a first direction; and b. Said picking/grasping member lies in a parallel plane to said first and second picking members and further, extends in a second direction, 180 degrees opposite to said first direction.

* * * * *